United States Patent [19]

Ishibashi et al.

[11] Patent Number: 5,573,681
[45] Date of Patent: Nov. 12, 1996

[54] TRAVELING WIRE ELECTRIC DISCHARGE MACHINING APPARATUS CAPABLE OF WORKPIECE LOCATION DETERMINING AND ENERGY LEVEL ADJUSTMENT

[75] Inventors: Yuji Ishibashi; Masayuki Iwai, both of Aichi-ken, Japan

[73] Assignee: Brother Kogyo Kabushiki Kaisha, Nagoya, Japan

[21] Appl. No.: 277,797

[22] Filed: Jul. 20, 1994

[30] Foreign Application Priority Data

Jul. 20, 1993 [JP] Japan .................................... 5-178881

[51] Int. Cl.⁶ .............................. B23H 7/04; B23H 7/06
[52] U.S. Cl. ........................................................ 219/69.12
[58] Field of Search .......................... 219/69.12, 69.17, 219/69.13

[56] References Cited

U.S. PATENT DOCUMENTS

| | | | |
|---|---|---|---|
| 4,292,491 | 9/1981 | Tanaka et al. | 219/69.12 |
| 4,363,948 | 12/1982 | Itoh | 219/69.12 |
| 4,518,842 | 5/1985 | Obara | 219/69.12 |
| 4,581,513 | 4/1986 | Obara | 219/69.12 |
| 4,703,143 | 10/1987 | Okubo et al. | 219/69.12 |
| 4,868,760 | 9/1989 | Obara | 219/69.12 |
| 5,021,622 | 6/1991 | Magara et al. | 219/69.12 |
| 5,117,082 | 5/1992 | Bosson et al. | 219/69.12 |
| 5,504,294 | 4/1996 | Izumiya | 219/69.12 |

FOREIGN PATENT DOCUMENTS

| | | | |
|---|---|---|---|
| 59-76724 | 5/1984 | Japan | 219/69.12 |
| 62-88515 | 4/1987 | Japan | 219/69.12 |
| 62-40125 | 8/1987 | Japan . | |
| 62-47648 | 10/1987 | Japan . | |
| 63-2728 | 1/1988 | Japan . | |
| 63-68323 | 3/1988 | Japan | 219/69.13 |
| 4-30915 | 2/1992 | Japan | 219/69.12 |

*Primary Examiner*—Geoffrey S. Evans
*Attorney, Agent, or Firm*—Kane, Dalsimer, Sullivan, Kurucz, Levy, Eisele and Richard, LLP

[57] ABSTRACT

A traveling wire electric discharge machining apparatus machines a workpiece by applying periodic voltage pulses to a wire electrode while moving the wire electrode relative to the workpiece. A location on the workpiece is determined, according to a predetermined parameter. The location is before a change in machining direction of the workpiece. When the wire electrode is positioned at the determined location, a characteristic of the periodic voltage pulse is changed.

16 Claims, 7 Drawing Sheets

TRAVELING WIRE ELECTRIC DISCHARGE MACHINING APPARATUS CAPABLE OF WORKPIECE LOCATION DETERMINING AND ENERGY LEVEL ADJUSTMENT

BACKGROUND OF THE INVENTION

The present invention relates to a traveling wire electric discharge machining apparatus for machining, e.g., cutting, a workpiece by applying periodic voltage pulses to a wire electrode while it is moved relative to the workpiece.

There have heretofore been known electric discharge wire cutting apparatus, or traveling wire electric discharge machining apparatus, for cutting a workpiece by applying periodic voltage pulses to a wire electrode while moving the wire electrode relative to the workpiece.

A machining process carried out by a conventional electric discharge wire cutting apparatus and problems of such a machining process will be described below.

As shown in FIG. 1A, when a wire electrode 124 cuts a workpiece 102 by traveling along a straight path from a point C to a point D by a distance δ, the wire electrode 124 is subjected to a force due to a combined vector V1 of electric discharge reactive forces from a new electric discharge machining area S1, in a direction DC.

On the other hand, as shown in FIG. 1B, when the wire electrode 124 is moved along a 90° turn from the point C to a point E by the distance δ, thus machining a corner into the workpiece 102, a force due to a combined vector V2 of electric discharge reactive forces from a new electric discharge machining area S2 is applied in a direction EF, rather than in a direction EC. As a result, the wire electrode 124 suffers a flexure α in the direction EF, and is displaced a distance β in a direction perpendicular to the direction EC. Since the wire electrode 124 vibrates owing to its forced displacement, it excessively machines the workpiece 102, causing a corner 113 to be truncated, as shown in FIG. 2.

One conventional system for controlling an electric discharge machining process to reduce the truncating of a corner is disclosed in Japanese patent publication No. 63-2728, for example.

The disclosed electric discharge machining control system detects the amount of variation of the arrival of a wire electrode at an angular area of a shape to be machined in a workpiece, from a programmed positioned. A memory stores a plurality of electric machining conditions in a sequential order, and a controller switches between the stored electric machining conditions stepwise based on amount of variation detected by the detector, until the machined state of the angular area becomes a preset machined state in order to machine the workpiece 102 at a constant speed.

Further, as shown in FIG. 3, the wire electrode 124 is flexed arcuately by a maximum distance α in a direction opposite to the direction in which the wire electrode 124 machines the workpirce 102. In FIG. 3, the wire electrode 124 is supported by upper and lower wire guides 130, 132, and moves from the left to the right with respect to the workpiece 102. When the arcuately flexed wire electrode 124 changes its direction of movement, it cuts the workpiece 102 along a corner, causing the corner to be truncated.

FIG. 4A shows the path of movement of the wire electrode 124 along an upper surface of the workpiece 102. FIG. 4B shows the path of movement of the wire electrode 124 along the center (measured in the thickness direction) of the workpiece 102. It can be seen from FIGS. 4A and 4B that the corner is more truncated at the center of the workpiece 102, than at the upper surface.

According to the electric discharge machining control system disclosed in the above publication, switching between the electric machining conditions is carried out immediately after the wire electrode 124 turns the corner. Therefore, even with the conventional electric discharge machining control system, the corner is machined by the arcuately flexed wire electrode 124, and it is not possible to sufficiently prevent truncation of the corner.

SUMMARY OF THE INVENTION

It is therefore an object of the present invention to provide a traveling wire electric discharge machining apparatus which reduces the flexure of a wire electrode at the time it changes the direction of movement, for thereby reducing the truncation of a corner in a workpiece in order accurately machine the workpiece.

According to one aspect of the present invention, there is provided a traveling wire electric discharge machining apparatus comprising:

a wire for machining a workpiece to a predetermined shape according to a predetermined machining program;

a moving table for moving said workpiece relative to said wire;

an electric discharge unit for applying a periodic voltage pulse to said wire;

means for determining a location on said workpiece, said location determined in accordance with at least one predetermined parameter, said location positioned before a change in a machining direction of said predetermined machining program; and means for changing a characteristic of said periodic voltage pulse when said wire is positioned at said location. According to another aspect of the present invention, there is provided a traveling wire electric discharge machining apparatus comprising:

a wire for machining a workpiece to a predetermined shape according to a predetermined machining program;

a moving table for moving said workpiece relative to said wire;

an electric discharge unit for applying a periodic voltage pulse to said wire;

means for determining an area on said workpiece, said area determined in accordance with at least one predetermined parameter; and means for changing a period of said periodic voltage pulse when said wire is positioned within said area.

According to a further aspect of the present invention, there is provided a method of machining a workpiece by discharging a traveling wire which is moved relative to said workpiece, said method comprising the steps of:

applying a periodic voltage pulse to said wire;

moving said wire relative to said workpiece according to a predetermined machining program;

determining a location on said workpiece in accordance with at least one predetermined parameter; and changing a period of said periodic voltage pulse when said wire is at said location.

DESCRIPTION OF THE ACCOMPANYING DRAWINGS

DESCRIPTION OF THE EMBODIMENT

Figure 1A:
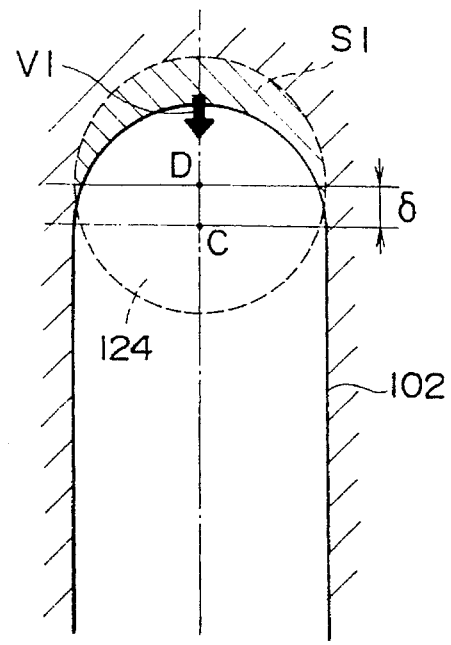
FIG. 1A is a view showing how electric discharge reactive forces are applied to a wire electrode when the wire electrode machines a workpiece along a straight path.
Figure 1B:
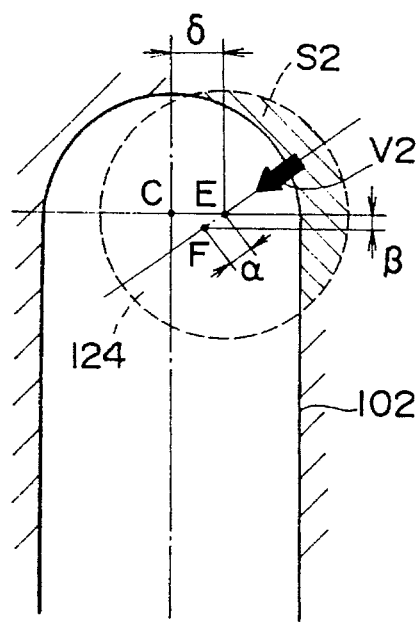
FIG. 1B is a view showing how electric discharge reactive forces are applied to the wire electrode when the wire electrode machines a corner in the workpiece.
Figure 2:
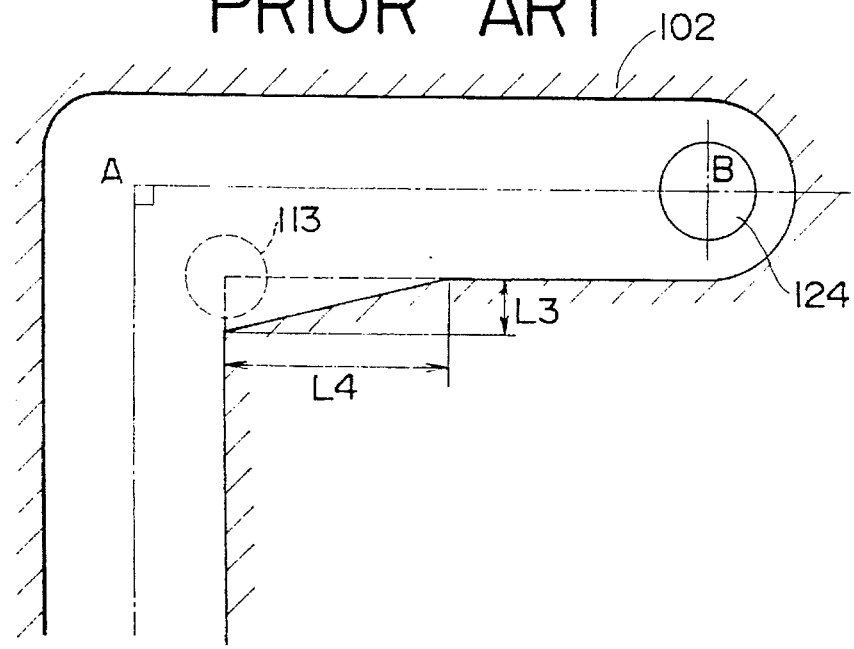
FIG. 2 is a view showing the truncating of a corner machined in a workpiece by a conventional traveling wire electric discharge machining apparatus.
Figure 3:
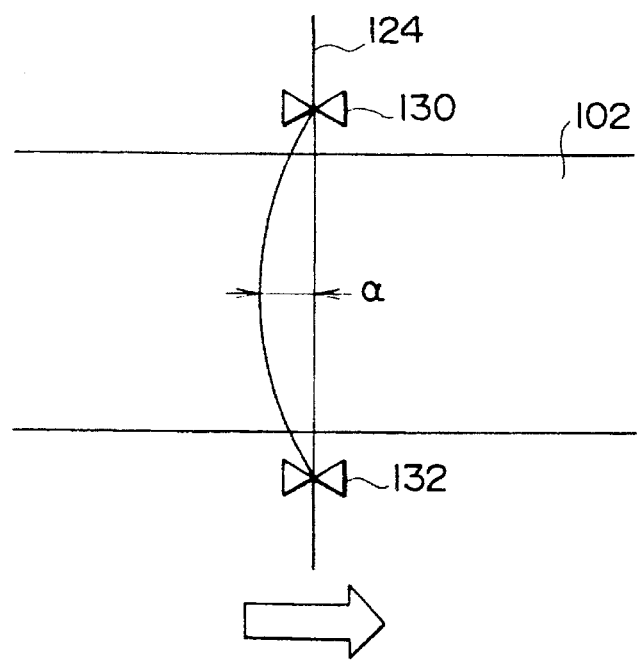
FIG. 3 is a view showing how a wire electrode is flexed upon electric discharge machining of a workpiece.
Figure 4A:
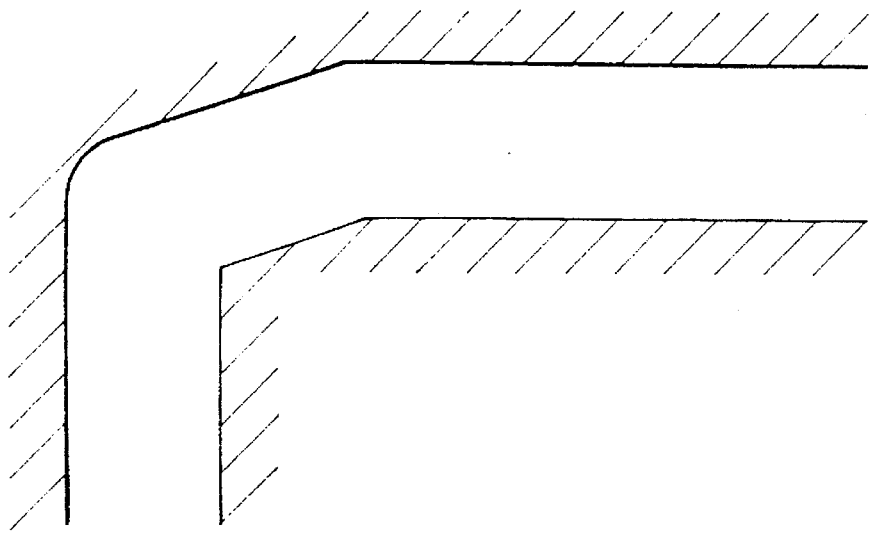
FIG. 4A is a view showing the path of movement of a wire electrode on an upper surface of a workpiece.
Figure 4B:
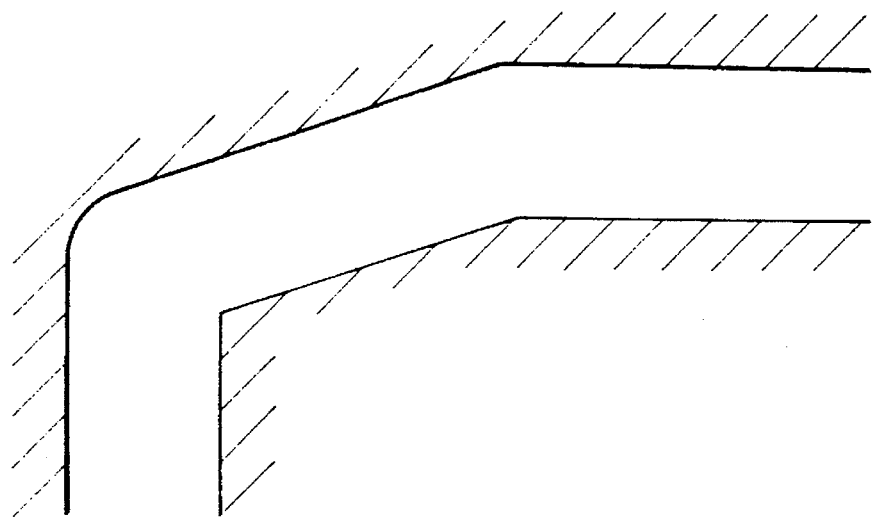
FIG. 4B is a view showing the path of movement of a wire electrode in the workpiece at half of the thickness of the workpiece.
Figure 5:
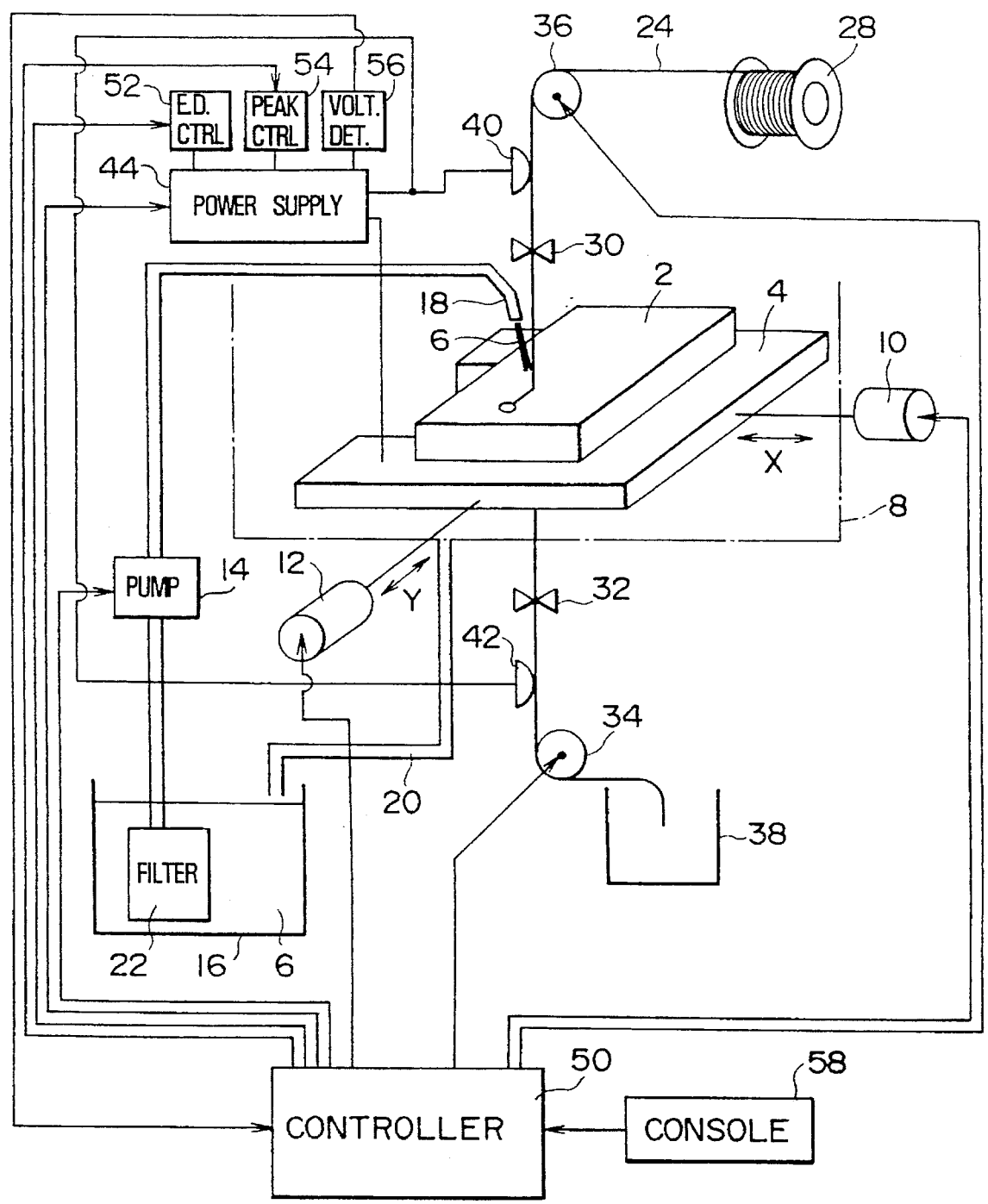
FIG. 5 is a schematic view of the traveling wire electric discharge machining apparatus according to the present invention.

FIG. 5 shows a traveling wire electric discharge machining apparatus according to the present invention. A workpiece 2 to be machined is supported on a movable table 4. The movable table 4 is disposed in a machining chamber 8 which holds a machining solution 6. The movable table 4 can be moved in the X-axis and Y-axis directions, respectively, in the machining chamber 8 by the x-axis and Y-axis servomotors 10, 12, respectively.

The machining solution 6 is drawn out from a machining solution tank 16 by a pump 14, supplied to a machined region of the workpiece 2, and then stored in the machining chamber 8. Any used machining solution which has overflowed the machining chamber 8 returns through a drain pipe 20 to the machining solution tank 16, and is then filtered by a filter 22 and drawn out again from the machining solution tank 16, by the pump 14.

A wire electrode 24 for machining, e.g., cutting, the workpiece 2 is unwound from a wire bobbin 28, and supported by upper and lower wire guides 30, 32 which are positioned above and below, respectively, the workpiece 2. The wire electrode 24 is transported under tension by a wire drive motor 34 and a tension roller 36. A used portion of the wire electrode 24 is discharged into a used wire storage container 38.

upper and lower electric feeders 40, 42 are positioned in contact with the wire electrode 24, and are above and below, respectively, the upper and lower wire guides 30, 32. A machining power supply 44 supplies the upper and lower electric feeders 40, 42 with a periodic voltage pulse, which is then applied to the wire electrode 24. When the periodic voltage pulse is applied to the upper and lower electric feeders 40, 42 and the movable table 4 by the machining power supply 44, an electric discharge is produced between the wire electrode 24 and the workpiece 2, thereby machining the workpiece 2.

An electric discharge control unit 52 is also electrically connected to the machining power supply 44, and controls the period of the voltage pulses (and therefore the electric discharge period) at which the pulse signal is generated, in accordance with a signal from a controller 50. A peak current control unit 54 which controls a peak current (electric discharge energy) flowing from the machining power supply 44 to the wire electrode 24, and an inter-electrode voltage detector 56 which detects an average inter-electrode voltage (hereinafter referred to as an "inter-electrode voltage") between the wire electrode 24 and the workpiece 2, are also connected to the machine power supply 44.

Figure 6:
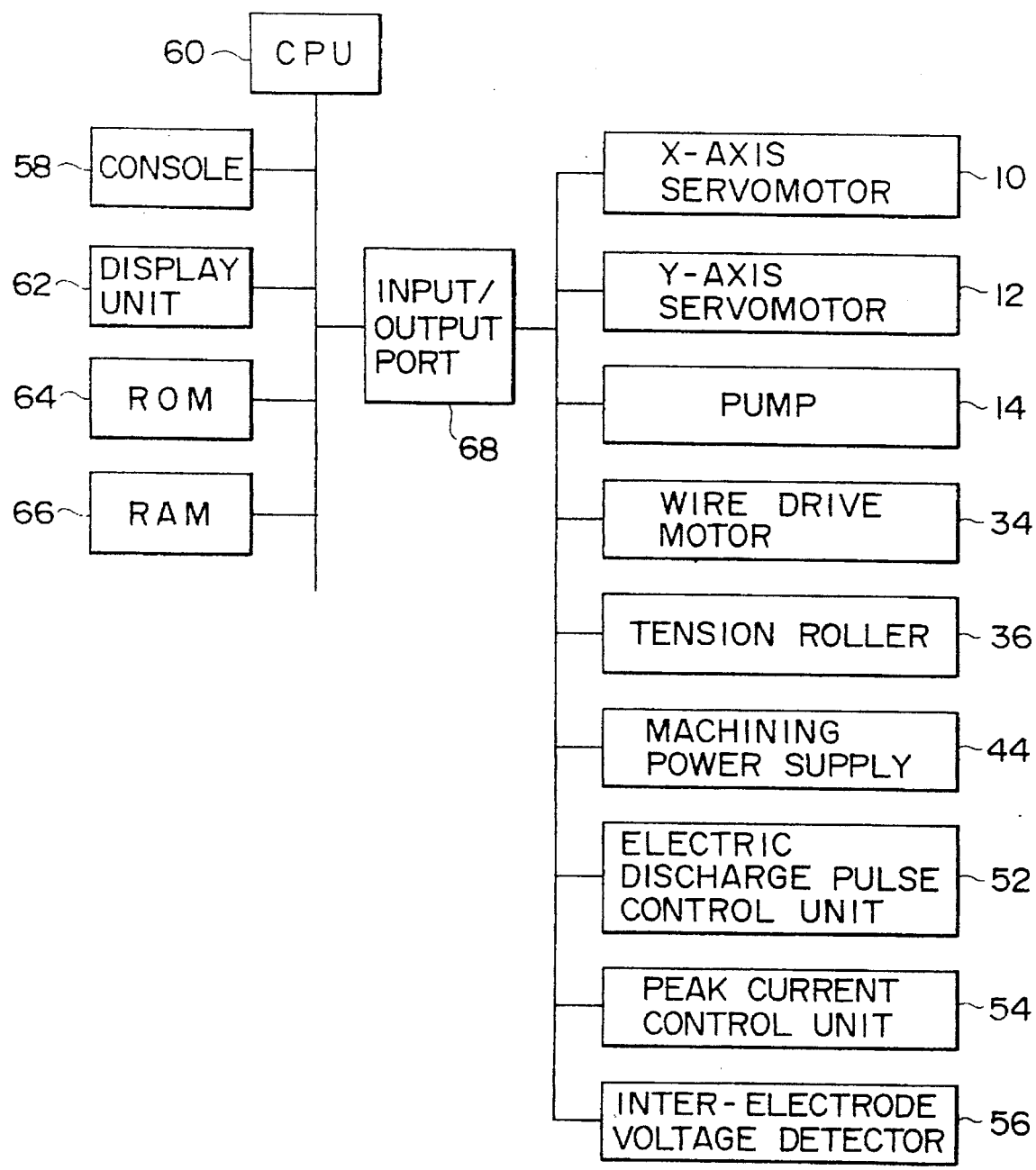
FIG. 6 is a block diagram of a controller of the traveling wire electric discharge machining apparatus according to the present invention.

As shown in FIG. 6, the controller 50 comprises a central processing unit (CPU) 60, a display unit 62, a read-only memory (ROM) 64, a random-access memory (RAM) 66, and an input/output port 68. Based on various machining conditions, (i.e., a program for indicating a machined shape, etc., and electric machining conditions including an electric discharge period, electric discharge energy, etc.), which are inputted from a console 58, and also on an inter-electrode voltage detected by the inter-electrode voltage detector 56, the controller 50 outputs control signals to control the X-axis servomotor 10, the Y-axis servomotor 12, the pump 14, the wire drive motor 34, the tension motor 36, the machining power supply 44, the electric discharge control unit 52, and the peak current control unit 54.

Specifically, the controller 50 carries out the following control processes (1) through (5):

(1) The controller 50 controls the rotational speeds of the X-axis and Y-axis servomotors 10, 12, respectively, so that the actual inter-electrode voltage detected by the inter-electrode voltage detector 56 will be equalized to a target inter-electrode voltage which is entered from the console 58, thereby controlling the moving speed of the movable table 4, and therefore the workpiece 2.

(2) The controller 50 controls the shape of the machined workpiece 2 by controlling the X-axis and Y-axis servomotors 10, 12, respectively, depending on the machined shape that is entered from the console 58.

(3) The controller 50 actuates the pump 14 to circulate the machining solution 6.

(4) The controller 50 controls an electrode feed process by energizing the wire drive motor 34 and the tension roller 36 to move the wire electrode 24.

(5) The controller 50 applies a control signal to the electric discharge control unit 52 based on an electric discharge period, a target inter-electrode voltage, and an electric discharge energy which are inputted from the console 58, to control the electric discharge period at which the machining power supply 44 generates electric discharge pulses.

When a programmed machining process is started, the controller 50 starts executing the following processing sequence: The controller 50 reads a first block of a numerical control (NC) program stored in the RAM 66, analyzes the read block, and outputs control signals to the X- and Y-axis servomotors 10, 12. The movable table 4 now starts moving. At this time, the machining solution 6 is being circulated by the pump 14, and the wire electrode 24 is being transported by the wire drive motor 34 and the tension roller 36. Electric discharge pulses are produced between the wire electrode 24 and the workpiece 2 by the electric discharge control unit 52 and the machining power supply 44 to start machining, the workpiece 2. When the workpiece 2 starts being machined, the moving speed of the movable table 4 is controlled so that inter-electrode voltage will become the target inter-electrode voltage, and the average moving speed per unit time is calculated at the same time.

While the workpiece 2 is being machined, the CPU 60 analyzes the shape which has been entered from the console 58. When it is determined that a corner (which is located at a junction between program blocks) is to be machined, the controller 50 begins to execute a corner truncating prevention control process. The controller 50 may determine whether the corner truncation prevention control process is to be carried out or not, depending on the angle that is to be formed between the program blocks.

The concept of the corner truncation prevention control process, and an actual control sequence of the corner truncation prevention control process, will be described below with reference to FIG. 8.

As described above, when the wire electrode 24 is arcuately flexed cuts the workpiece 2 along a corner, the wire electrode 24 causes the corner to be truncated. To reduce the amount of truncation of the corner, it is necessary to remove the flexure of the wire electrode 24 before it cuts the corner. The flexure $\alpha$ of the wire electrode 24 is generally given by the following equation (1):

$$\alpha = K \times P \times L / Wt \tag{1}$$

where

K: a constant,

P: the electric discharge reactive forces,

L: the distance between the upper and lower wire guides 30, 32, and

Wt: the tension applied to the wire electrode 24 by the wire drive motor 34 and the tension roller 36.

The electric discharge reactive forces P are correlated to the machining conditions such that when the machining conditions are varied, the electric discharge reactive forces acting on the wire electrode 24 also vary. For example, when the electric discharge period, which is one of the machining conditions, is increased, since the number of voltage pulses applied per unit time is reduced, the electric discharge reactive forces are also reduced. This reduces the flexure $\alpha$ of the wire electrode 24.

More specifically, before machining the corner, the electric discharge period is increased to remove the flexure of the wire electrode 24 thereby reducing the amount of truncation of the corner. However, after the electric discharge period is increased, there is a certain time delay before the corner is actually machined with the increased electric discharge period, and hence the flexure $\alpha$ of the wire electrode 24 will not be removed immediately after the electric discharge period is increased. It has been determined that the flexure $\alpha$ of the wire electrode 24 can be removed by machining the workpiece 2 for a certain distance after the electric discharge period is increased.

Figure 8:
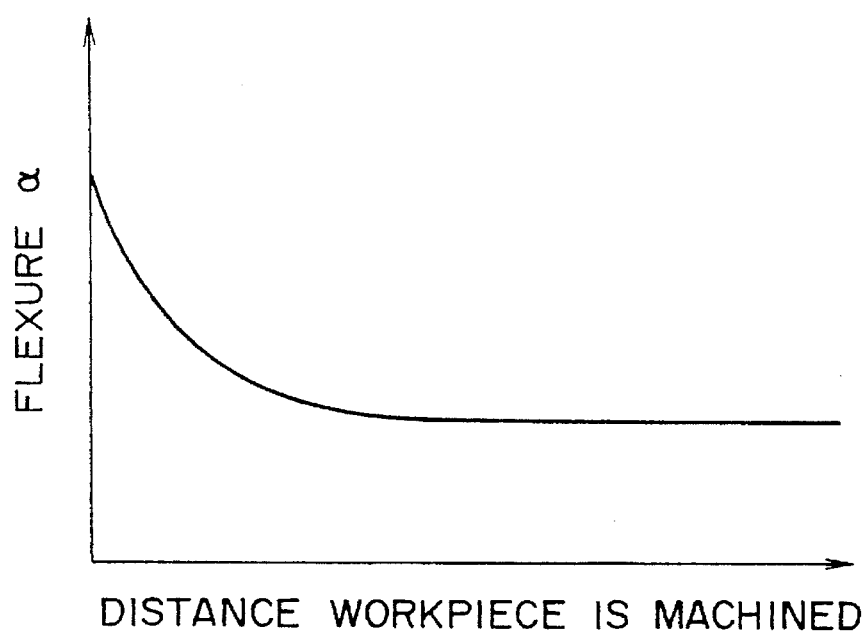
FIG. 8 is a graph showing the relationship between the distance for which a workpirce is machined and the flexure of a wire electrode after the period of an electric discharge is increased.

FIG. 8 shows the relationship between the distance for which the workpiece 2 is machined and the flexure $\alpha$ of the wire electrode 24 after the electric discharge period is increased. It has also been determined that a short circuit tends to be developed between the wire electrode 24 and the workpiece 2 when the electric discharge period is abruptly increased while the workpiece 2 is being machined. Therefore, to reduce the amount of truncation of a corner, it is necessary to provide a zone in which to stepwisely increase the electric discharge period (by increasing the time between the periodic voltage pulses), before the corner is reached. This zone is hereinafter referred to as a "zone A".

Figure 7:
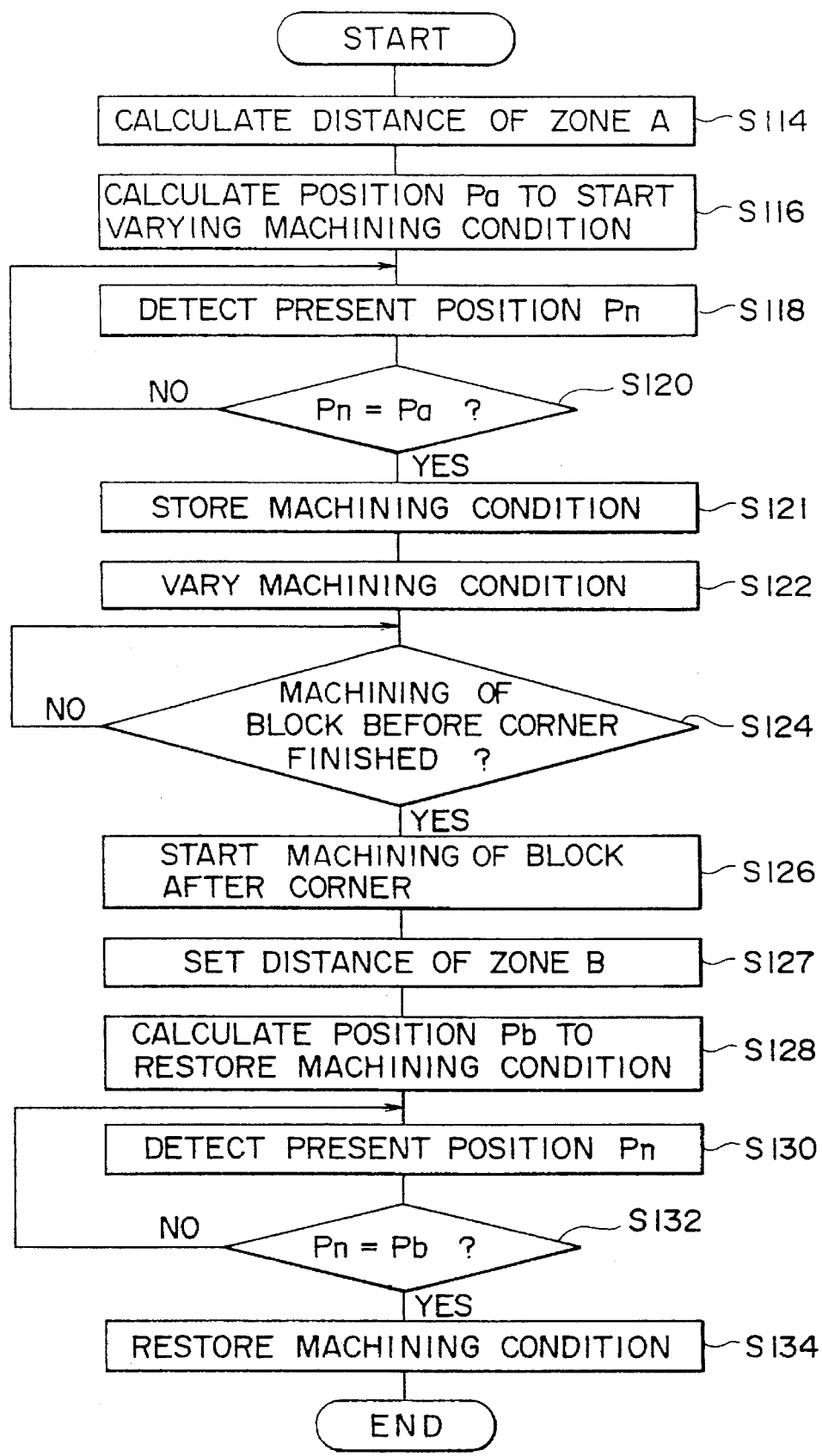
FIG. 7 is a flowchart of a control sequence of a corner truncation prevention control process carried out by the controller shown in FIG. 6.

The operation of the machining process for a corner will be described below with reference to FIG. 7.

After the CPU 60 has detected the corner in the programmed machining process, the CPU 60 calculates the distance of the zone A, in step S114. The distance of the zone A depends on the speed of movement of the wire electrode 24 immediately before it enters the zone A, a plurality of electric discharge periods which are increased stepwise in the zone A, and the electric discharge period at the time the corner is machined. The speed of movement of the wire electrode 24 is the average speed of movement of the wire electrode 24 per unit time immediately before the wire electrode 24 enters the zone A. Only the electric discharge period at the time the corner is machined, is entered through the console 58. The distance of the zone A and the plurality of electric discharge periods which are increased stepwise in the zone A are calculated as follows:

The plurality of electric discharge periods which are increased stepwise in the zone A are given according to the equation (2) below:

$$SC(n) = SC(0) \times K_1^n \tag{2}$$

where

SC(n): the nth electric discharge period,

SC(0): the electric discharge period preset before the wire electrode 24 enters the zone A, and $K_1$: a constant ($K_1 > 1$).

The distance of the zone A at the time when the electric discharge periods are stepwisely increased in the zone A is calculated as follows:

If it is assumed that the time for which the wire electrode 24 moves in one-step electric discharge in the zone A is Ts, and the time required to vary the electric discharge period through n steps is Tn, then equation (3) below, is satisfied:

$$n = Tn/Ts \tag{3}$$

where

Tn: the time required to vary the electric discharge period through n steps; and Ts: the time for which the wire electrode 24 moves in one-step electric discharge in the zone A.

From the equations (2) and (3), the time Tn is given by equation (4), below:

$$Tn = (Ts/\log K_1) \times \log (SC(n)/SC(0)) \tag{4}$$

From the equation (4), the time Tt for the wire electrode 24 to move through the zone A is given by equation (5) below:

$$Tt = (Ts/\log K_1) \times \log (SC(t)/SC(0)) \tag{5}$$

where

Tt is the time Tt for the wire electrode to move through the zone A; and

SC(t) is the electric discharge period set to suppress electric discharge reactive forces at the corner (the electric discharge period set at the end of zone A).

Because it has experimentally been known that the speed of movement and the electric discharge period are inversely proportional to each other, equation (6) below, is satisfied:

$$F(0) \times SC(0) = F(n) \times SC(n) \qquad (6)$$

where

F(0): the average speed of movement per unit time immediately before the wire electrode 24 enters the zone A; and F(n): the speed of movement at the time when electric discharge reactive forces are suppressed at the corner.

From the equations (2), (3), and (6), the following equation is satisfied:

$$F(n) = F(0) \times (1/K_1)^{(Tn/Ts)} \qquad (7).$$

In order to determine the distance of the zone A, the speed F(n) of movement may be integrated with respect to time. Therefore, the distance of the zone A can be calculated according to equation (8) below:

$$\begin{aligned} A &= \int_0^T F(n) dTn \\ &= F(0) \times (Ts(\log K_1)) \times (1 - SC(0)/SC(t)) \end{aligned} \qquad (8)$$

By thus varying the electric discharge period according to the equation (2) and determining the distance of the zone A according to the equation (8), a target electric discharge period is reached in front of the corner, so that the flexure of the wire electrode 24 can be removed.

In the above embodiment, the electric discharge period preset at the corner is entered through the console 58. However, it is possible to calculate the electric discharge period at the time the corner is machined by entering the material and thickness of the workpiece 2 and the allowable amount of truncation of the corner in the workpiece 2, through the console 58.

The discharge electric period may be stepwise varied according to the equation (9), given below, rather than the equation (2) above. The plurality of electric discharge periods that are increased stepwise in the zone A may be entered through the console 58.

$$SC(n) = SC(0) + n \times SCadd \qquad (9)$$

where

SCadd: the increment of the electric discharge period.

After the distance of the zone A has been calculated in step S114, the CPU 60 calculates a position Pa where the electric discharge period is to be varied, in step S116. The position Pa is a position which is located in front of a corner by the distance of the zone A.

The workpiece 2 is continuously machined until the wire electrode 24 enters the zone A in steps S118, S120, where the present position Pn is detected and compared with Pa. When the wire electrode 24 enters the zone A, the electric discharge period SC(0) set before it enters the zone A is stored in the RAM 66 in step S121. Then, the CPU 60 starts varying the electric discharge period according to the equation (2) in step S122.

when the block before the corner has been machined in step S124, machining of the next block after the corner, is started in step S126.

When the machining of the next block after the corner is started in the step S126, the electric discharge period is set to the value (SC(t)). In order to prevent corner truncation which would otherwise occur due to vibration of the wire electrode 24, the CPU 60 establishes a distance for which the workpiece 2 is to be machined with the electric discharge period set to SC(t). This distance will be referred to hereinafter as zone B.

Figure 9:
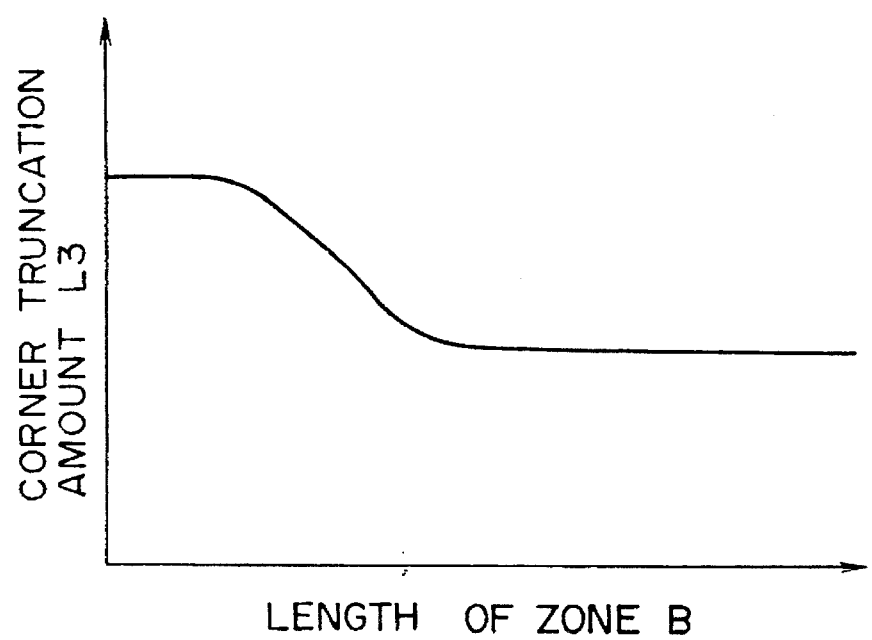
FIG. 9 is a graph showing the relationship between the distance of a zone B and the amount of corner truncation.

The relationship between the distance of the zone B and the truncation amount L3 of the corner 13, is shown in FIG. 9. More specifically, when a length of zone B is increased, the truncation amount L3 of the corner 13 is reduced. However, when the length of zone B increases beyond a certain value, the truncation amount L3 of the corner 13 does not decrease. It has been experimentally determined that the optimum length of the zone B is between 0.2 mm and 0.3 mm. In this embodiment, the length of the zone B is set to 0.3 mm, in the controller 50.

In step S128, the CPU 60 calculates a position Pb where the, electric discharge period is restored to its original value. The position Pb is spaced a distance equivalent to the length of zone B after the starting point of the block started in step 126.

The workpiece 2 is continuously machined until the wire electrode 24 leaves the zone B in steps S130, S132. When the wire electrode 24 leaves zone B, the CPU 60 restores the electric discharge period to its original value in step S134. If the electric discharge period is abruptly reduced while the workpiece 2 is being machined, the wire electrode 24 and the workpiece 2 tend to form a short-circuit, and the wire electrode 24 is liable to be broken. After the wire electrode 24 has left the zone B, therefore, it is necessary to stepwisely vary the electric discharge period in order to restore the electric discharge period to its original value. For example, the electric discharge period is varied according to the equation (10) below:

$$SC(n) = SC(0) \times K_2^n \qquad (10)$$

where

SC(n): the nth electric discharge period,

SC(0): the electric discharge period preset in the zone B, and $K_2$: a constant ($K_2 < 1$).

When the electric discharge period has been restored to the value, stored in the RAM 66, which was set before the wire electrode 24 entered zone A, the corner truncation prevention control process is finished.

The control sequence described above is repetitively executed each time a corner is detected until the programmed machining process comes to an end.

In the above embodiment, the length of zone B is preset in the controller 50. However, it is possible to set the length of zone B using the console 58. The electric discharge period may be varied according to the following equation (11), rather than the above equation (10):

$$SC(n) = SC(0) - n \times SCsub \qquad (11)$$

where

SCsub: the decrement of the electric discharge period.

While the electric discharge period has been adjusted to vary the machining condition, a target inter-electrode voltage or an electric discharge energy may also be used to vary the machining condition.

with the traveling wire electric discharge machining apparatus according to the present invention, a machining condition is varied to reduce the electric discharge reactive forces before a corner is reached, the flexure α of the wire electrode is therefore minimized at the corner. When the direction of relative movement of the wire electrode and the workpiece is then changed, therefore, any truncation of the corner due to the flexure of the wire electrode is also minimized. After the wire electrode has passed the corner, the wire electrode machines the workpiece under the adjusted machining condition. Consequently, any truncation of the corner due to electric discharge reactive forces resulting from a change in the machining area is also held to a minimum. Therefore, the traveling wire electric discharge machining apparatus can accurately machine a corner in the workpiece.

What is claimed is:

1. A traveling wire electric discharge machining apparatus comprising:
   a wire for machining a workpiece to a predetermined shape according to a predetermined machining program;
   a moving table for moving said workpiece relative to said wire;
   an electric discharge unit for applying a periodic voltage pulse to said wire;
   means for determining a location on said workpiece, said location determined in accordance with at least one predetermined parameter, and said location being positioned before a change in a machining direction point of said predetermined machining program; and
   means for changing a characteristic of said periodic voltage pulse to gradually decrease the machining energy, while said wire is moving relative to said workpiece, from when said wire is at said location until prior to said wire reaching said machining direction change point.

2. The traveling wire electric discharge machining apparatus according to claim 1 which further comprises a means for determining an inter-electrode voltage, wherein said at least one predetermined parameter includes said inter-electrode voltage.

3. The traveling wire electric discharge machining apparatus according to claim 1 which further comprises a means for storing an original value of said periodic voltage pulse characteristic.

4. The traveling wire electric discharge machining apparatus according to claim 3 which further comprises a means for inputting data corresponding to a second location which is positioned after said change in a machining direction, wherein when said wire is positioned at said second location, said periodic voltage pulse characteristic is restored to said original value.

5. The traveling wire electric discharge machining apparatus according to claim 1 wherein said periodic voltage pulse characteristic is a period of said periodic voltage pulse.

6. A traveling wire electric discharge machining apparatus comprising:
   a wire for machining a workpiece to a predetermined shape according to a predetermined machining program;
   a moving table for moving said workpiece relative to said wire;
   an electric discharge unit for applying a periodic voltage pulse to said wire;
   means for determining an area on said workpiece, said area determined to include a machining direction changing point; and
   means for gradually changing a period of said periodic voltage pulse while said wire is moving relative to said workpiece, when said wire is positioned within said area and prior to reaching said machining direction changing point.

7. The traveling wire electric discharge machining apparatus according to claim 6 wherein when said wire is positioned at a boundary of said area, said period is stepwisely changed from a first period to a second period.

8. The traveling wire electric discharge machining apparatus according to claim 7 wherein said first period is shorter than said second period.

9. The traveling wire electric discharge machining apparatus according to claim 7 which further comprises a means for storing said first period.

10. The traveling wire electric discharge machining apparatus according to claim 9 wherein when said wire is positioned at another boundary of said area after passing through said machining direction changing point said period is restored to said first period.

11. The traveling wire electric discharge machining apparatus according to claim 10 which further comprises a means for inputting data corresponding to a location of said another boundary of said area.

12. The traveling wire electric discharge machining apparatus according to claim 10 which further comprises a means for determining an inter-electrode voltage, wherein a location of said boundary of said area is determined in accordance with said inter-electrode voltage.

13. A method of machining a workpiece by discharging a traveling wire which is moved relative to said workpiece, said method comprising the steps of;
   applying a periodic voltage pulse to said wire;
   moving said wire relative to said workpiece in a machining direction according to a predetermined machining program;
   determining a location on said workpiece upstream of a point at which the machining direction changes; and
   as said wire is moving, changing a period of said periodic voltage pulse when said wire reaches said location.

14. The method according to claim 13 wherein said at least one predetermined parameter includes an inter-electrode voltage.

15. The method according to claim 13 which further comprises the step of stepwisely changing said period of said periodic voltage pulse from a first period to a second period when said wire is at said location.

16. The method according to claim 13 which further comprises the step of storing said first period, wherein when said wire is positioned at another location downstream of said point, said period is changed from said second period to said first period.

* * * * *